US011954007B2

(12) United States Patent
Rosati et al.

(10) Patent No.: US 11,954,007 B2
(45) Date of Patent: Apr. 9, 2024

(54) TRACKING USAGE OF COMMON LIBRARIES BY MEANS OF DIGITALLY SIGNED DIGESTS THEREOF

(71) Applicant: INTERNATIONAL BUSINESS MACHINES CORPORATION, Armonk, NY (US)

(72) Inventors: Leonardo Rosati, Rome (IT); Francesco Maria Carteri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 17/659,883

(22) Filed: Apr. 20, 2022

(65) Prior Publication Data
US 2023/0342277 A1    Oct. 26, 2023

(51) Int. Cl.
*G06F 11/34* (2006.01)
*G06F 8/36* (2018.01)
*H04L 9/32* (2006.01)

(52) U.S. Cl.
CPC ............ *G06F 11/3438* (2013.01); *G06F 8/36* (2013.01); *H04L 9/3247* (2013.01); *G06F 2201/865* (2013.01)

(58) Field of Classification Search
CPC ................................ G06F 11/3438; G06F 8/36
(Continued)

(56) References Cited

U.S. PATENT DOCUMENTS

| | | | |
|---|---|---|---|
| 5,892,904 A | | 4/1999 | Atkinson |
| 5,910,987 A | * | 6/1999 | Ginter .................. H04L 63/083 705/52 |

(Continued)

FOREIGN PATENT DOCUMENTS

| | | |
|---|---|---|
| AU | 2006235153 B2 | 10/2006 |
| CA | 2923740 C | 3/2002 |

(Continued)

OTHER PUBLICATIONS

Hecht et al, "Tracking the Software Quality of Android Applications along their Evolution", IEEE, pp. 236-247 (Year: 2015).*
(Continued)

*Primary Examiner* — Anil Khatri
(74) *Attorney, Agent, or Firm* — David B. Woycechowsky

(57) ABSTRACT

Tracking software usage through the following operations: calculating current digests of common libraries used by software programs and obtaining digital signatures of tracking information of the software programs comprising identifiers of their common libraries and the corresponding current digests; responses are returned to calls for the software programs in association with the corresponding tracking information and digital signatures. A corresponding method under the control of a client comprises receiving a response to a call for a software program in association with the corresponding tracking information and digital signature. The common libraries of the software program are tracked according to a verification of the digital signature and of the current digests against corresponding reference digests. Computer programs and computer program products for performing the methods are proposed. Moreover, corresponding server computing system, client computing system and computing infrastructure are proposed.

4 Claims, 11 Drawing Sheets

(58) Field of Classification Search
USPC .................................................. 717/168–174
See application file for complete search history.

(56) References Cited

U.S. PATENT DOCUMENTS

| | | | | |
|---|---|---|---|---|
| 6,834,110 | B1* | 12/2004 | Marconcini | G06F 16/958 380/282 |
| 6,848,048 | B1* | 1/2005 | Holmes | G06F 21/64 713/181 |
| 6,959,382 | B1* | 10/2005 | Kinnis | H04L 9/3247 713/168 |
| 7,650,505 | B1* | 1/2010 | Masurkar | H04L 67/02 713/176 |
| 8,065,665 | B1* | 11/2011 | Kosche | G06F 8/443 717/154 |
| 8,417,234 | B2* | 4/2013 | Sanding | H04W 12/068 455/418 |
| 8,544,007 | B2* | 9/2013 | Al-Aziz | H04L 67/306 718/100 |
| 8,725,645 | B1* | 5/2014 | Montini | G06F 21/125 705/52 |
| 8,751,793 | B2* | 6/2014 | Ginter | H04N 21/6581 726/28 |
| 9,032,204 | B2* | 5/2015 | Byrd | H04L 9/3268 705/76 |
| 9,098,333 | B1* | 8/2015 | Obrecht | G06F 9/50 |
| 9,323,950 | B2* | 4/2016 | Maletsky | G06F 21/72 |
| 9,779,232 | B1 | 10/2017 | Paczkowski | |
| 10,430,786 | B1* | 10/2019 | Camacho | H04L 9/3268 |
| 10,515,205 | B2* | 12/2019 | Eksten | G06F 21/51 |
| 11,157,623 | B2 | 10/2021 | Pappachan | |
| 2013/0227524 | A1 | 8/2013 | Im | |
| 2020/0125532 | A1 | 4/2020 | Ren | |

FOREIGN PATENT DOCUMENTS

| | | |
|---|---|---|
| JP | 2018503153 A | 2/2018 |
| WO | 2017016318 A1 | 2/2017 |

OTHER PUBLICATIONS

Zhang, "A Study on Application of Digital Signature Technology", IEEE, pp. 498-501 (Year: 2010).*
Hadri et al, "Identifying Software Usage at HPC Centers with the Automatic Library Tracking Database", ACM, pp. 1-8 (Year: 2010).*
Canfora et al, "Fine Grained Indexing of Software Repositories to Support Impact Analysis", ACM, pp. 105-111 (Year: 2006).*
Nunamaker et al, "Software Productivity: A framework of Study and an Approach to Reusable Components", IEEE, pp. 959-968 (Year: 1989).*
Zhou et al, "Study of One-way Hash Function to Digital Signature Technology", IEEE, pp. 1503-1506 (Year: 2006).*
Mell et al., "The NIST Definition of Cloud Computing", National Institute of Standards and Technology, Special Publication 800-145, Sep. 2011, 7 pages.

* cited by examiner

TRACKING USAGE OF COMMON LIBRARIES BY MEANS OF DIGITALLY SIGNED DIGESTS THEREOF

BACKGROUND

The present disclosure relates to the information technology field. More specifically, this disclosure relates to the tracking of software usage.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Most software programs use (common) libraries to implement common functionalities (either statically by incorporating them or dynamically by referencing them). The common libraries have well-defined interfaces declaring their functionalities, so that they may be used by multiple software programs that are independent to each other. Therefore, the software programs only need to know the interfaces of the common libraries, whereas they may be completely agnostic about their internal details. The common libraries foster reuse of software that is already available for similar purposes. Development of software programs may then focus on their peculiar functionalities, instead delegating the implementation of generic functionalities to corresponding common libraries, with a corresponding saving of costs and time. All of the above allows sharing software in a modular way, with some common libraries that have become a de facto standard for corresponding functionalities (such as HTTP (hypertext transfer protocol) calls, Internet browsing and so on). A typical example is that of common libraries released as Open-Source Software (OSS), whose source code is made available publicly for use, modification and distribution.

The common libraries (as any other software) are subject to continual upgrades. Particularly, this activity is aimed at supporting new technologies and at reducing security vulnerabilities (in addition to possibly increasing the functionalities of the common libraries). In fact, software/hardware environments evolve over time. Therefore, the common libraries are upgraded to stay abreast of their technological evolution. This is important to ensure that the software programs using the common libraries work correctly. Moreover, new threats are discovered over time. Therefore, the common libraries are upgraded to add corresponding security countermeasures.

However, even when upgraded versions of the common libraries are available, previous versions thereof may remain in use in several software programs for a relatively long time. The previous versions of the common libraries may then be less functional and/or more vulnerable, with a corresponding effect on the software programs using them. Therefore, calls to the software programs may cause execution errors and/or security exposures.

Tracking the common libraries that are used by the software programs is then important for assessing their quality.

However, this information may be difficult (if not impossible) to collect in many situations. A typical case is when the software programs implement services, which provide repeatable tasks that may be performed by remote servers on behalf of different clients, and particularly in cloud (computing) environments. In this case, (cloud) services are provided to corresponding users by cloud providers, which provision, configure and release computing resources required for their implementation upon request. The services are decoupled from their implementation, so that the corresponding software programs (and then the common libraries used by them as well) are completely opaque to the clients.

The software programs might declare the common libraries that are used and their versions. However, this requires adding dedicated logic to the software programs (with corresponding additional development cost/time). In any case, it would be difficult (if not impossible) to verify that the information declared by the software programs is genuine. This is especially true when the software programs are provided by different producers that are difficult to trust. A typical case is again when the software programs implement services, and particularly in cloud environments. In this case, it would not be possible to verify that the declared information has not been tampered.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of tracking the common libraries according to digitally signed digests thereof.

Particularly, an embodiment provides a method for tracking software usage under the control of a server computing system. The method comprises calculating current digests of common libraries used by software programs and obtaining digital signatures of tracking information of the software programs comprising identifiers of their common libraries and the corresponding current digests; responses are returned to calls for the software programs in association with the corresponding tracking information and digital signatures.

A further aspect provides a computer program for implementing the method.

A further aspect provides a corresponding computer program product.

A further aspect provides a server computing system for implementing the method.

A further aspect provides a method for tracking software usage under the control of a client computing system. The method comprises receiving a response to a call for a software program in association with the corresponding tracking information and digital signature. The common libraries of the software program are tracked according to a verification of the digital signature and of the current digests against corresponding reference digests.

A further aspect provides a computer program for implementing the method.

A further aspect provides a corresponding computer program product.

A further aspect provides a client computing system for implementing the method.

A further aspect provides a computing infrastructure comprising the server computing system and one or more client computing systems.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

Particularly.

DETAILED DESCRIPTION

As a consequence of the technology described, above in the Background section, the clients are unable to know which common libraries are used by the software programs that are called, let alone their versions. This prevents the clients from assessing whether the quality of the software programs is acceptable. A risk then exists of calling software programs using common libraries that do not provide the expected behavior in a software/hardware environment of the clients and/or may be used to attack the clients by exploiting vulnerabilities thereof. All of the above may cause damage to the clients having negative effects on them, for example, making the clients crush, disrupting their operation, gaining unauthorized access to information, preventing access to information, and so on.

With reference in particular to FIG. 1A-FIG. 1G, the general principles are shown of the solution according to an embodiment of the present disclosure.

Figure 1A:
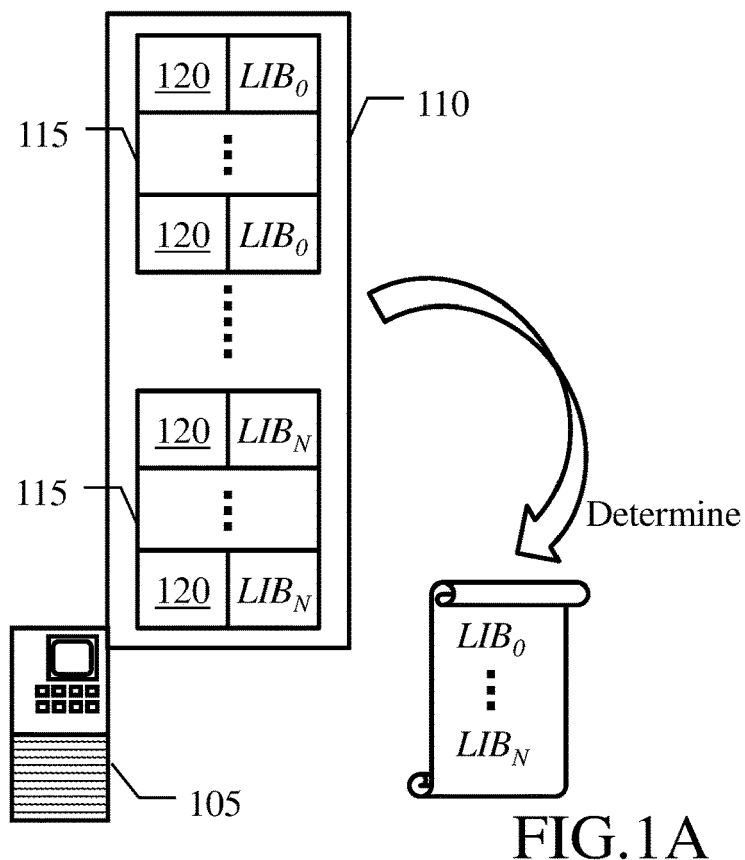
FIG. 1A-FIG. 1G show the general principles of the solution according to an embodiment of the present disclosure.

Starting from FIG. 1A, a server computing system, or simply, server 105 runs one or more software programs 110, only one shown in the figure (for example, implementing corresponding cloud services). Software program 110 uses one or more common libraries 115 (for example, open-source packages). Each common library 115 comprises one or more software components 120 (for example, files providing source code of Java classes). In the solution according to an embodiment of the present disclosure, each software component 120 is associated with a (common library) identifier $LIB_i$ (i=0 . . . N) of common library 115 wherein software component 120 is comprised (for example, a Java annotation added to its source code comprising name and version of common library 115). Server 105 determines the common libraries 115 that are used by each software program 110 according to the common library identifiers $LIB_i$ associated with their software components 120 (for example, by a runtime environment of software program 110).

Figure 1B:
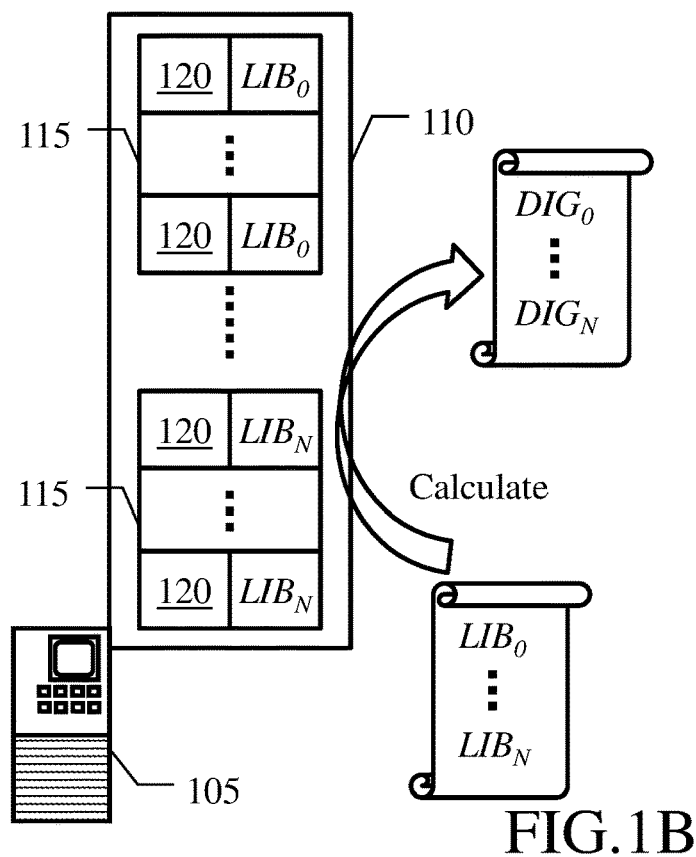

Moving to FIG. 1B, server 105 calculates corresponding current values of digests (current digests) $DIG_i$ of common libraries 115; each current digest $DIG_i$ is based on software components 120 of the corresponding common library 115, as indicated by the common library identifiers $LIB_i$ associated therewith (for example, equal to a hash value thereof).

Figure 1C:
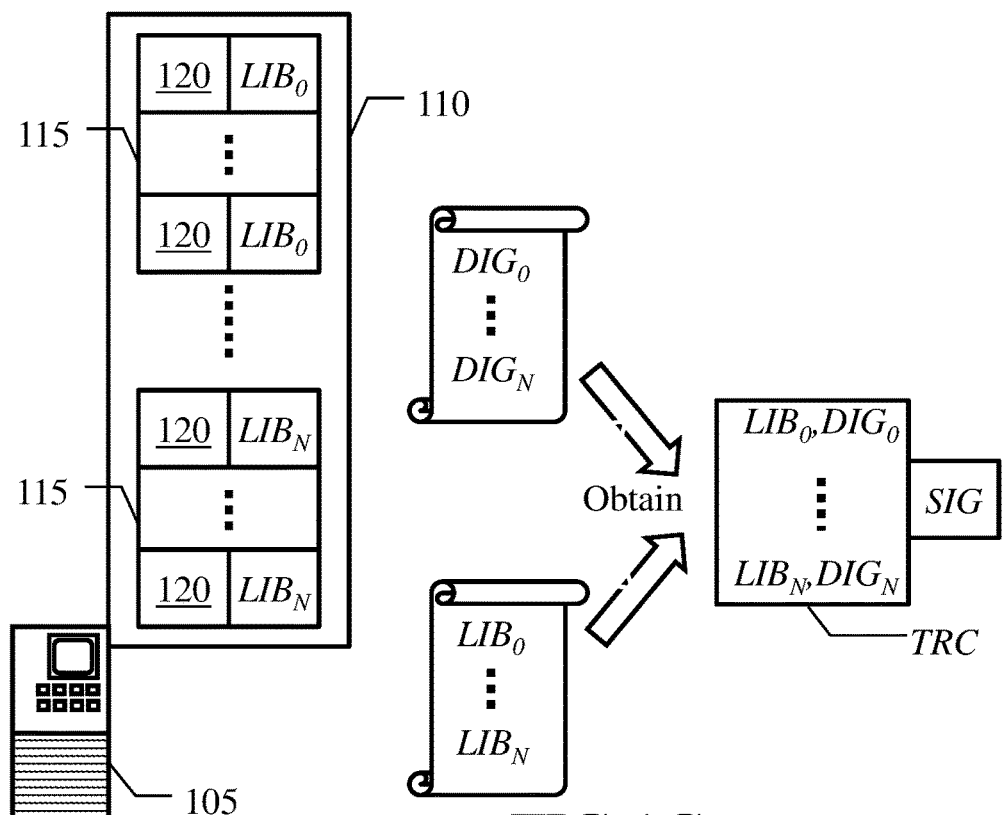

Moving to FIG. 1C, server 105 obtains a digital signature SIG of tracking information TRC of each software program 110 (for example, from an external service). The tracking information TRC comprises the common library identifiers $LIB_i$ (name/version) of common libraries 115 that are used by software program 110 and their current digests $DIG_i$.

Figure 1D:
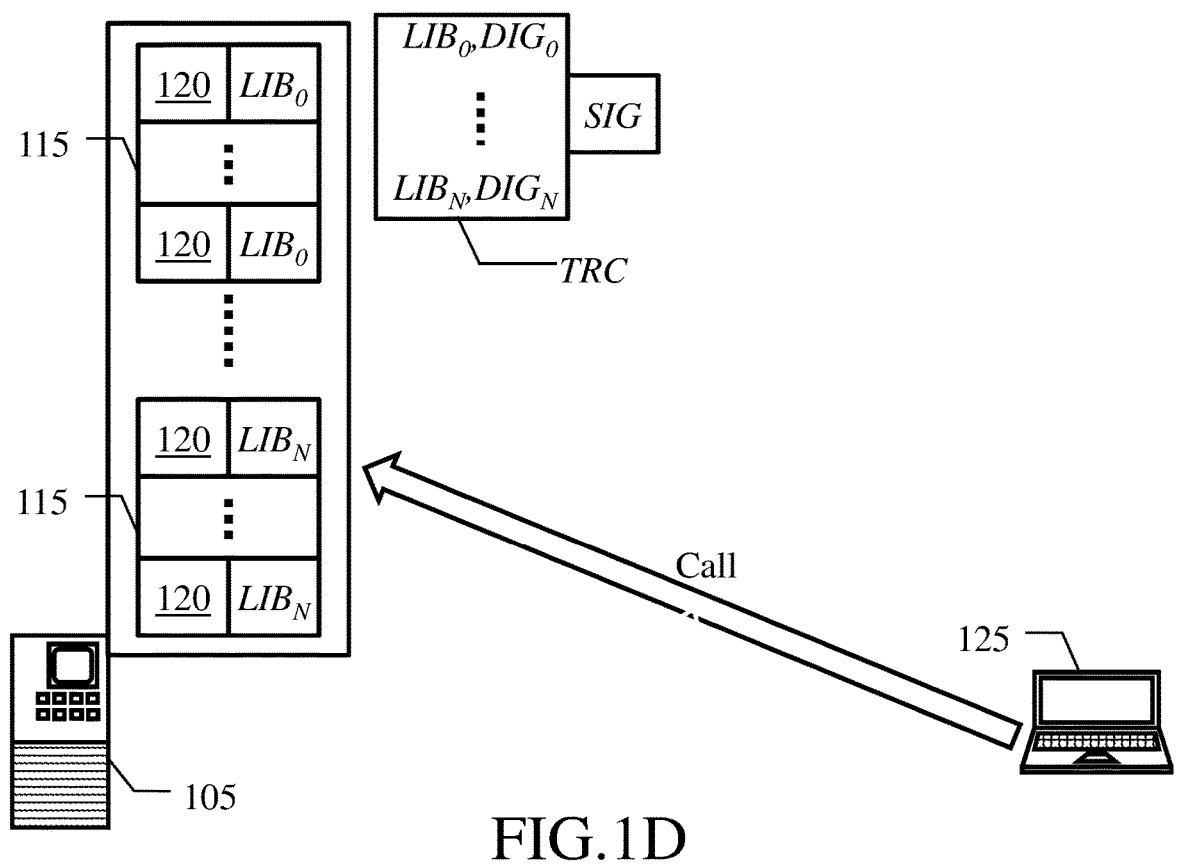

Moving to FIG. 1D, a client computing system, or simply client 125, submits a call to server 105 for software program 110 (for example, by invoking its cloud service).

Figure 1E:
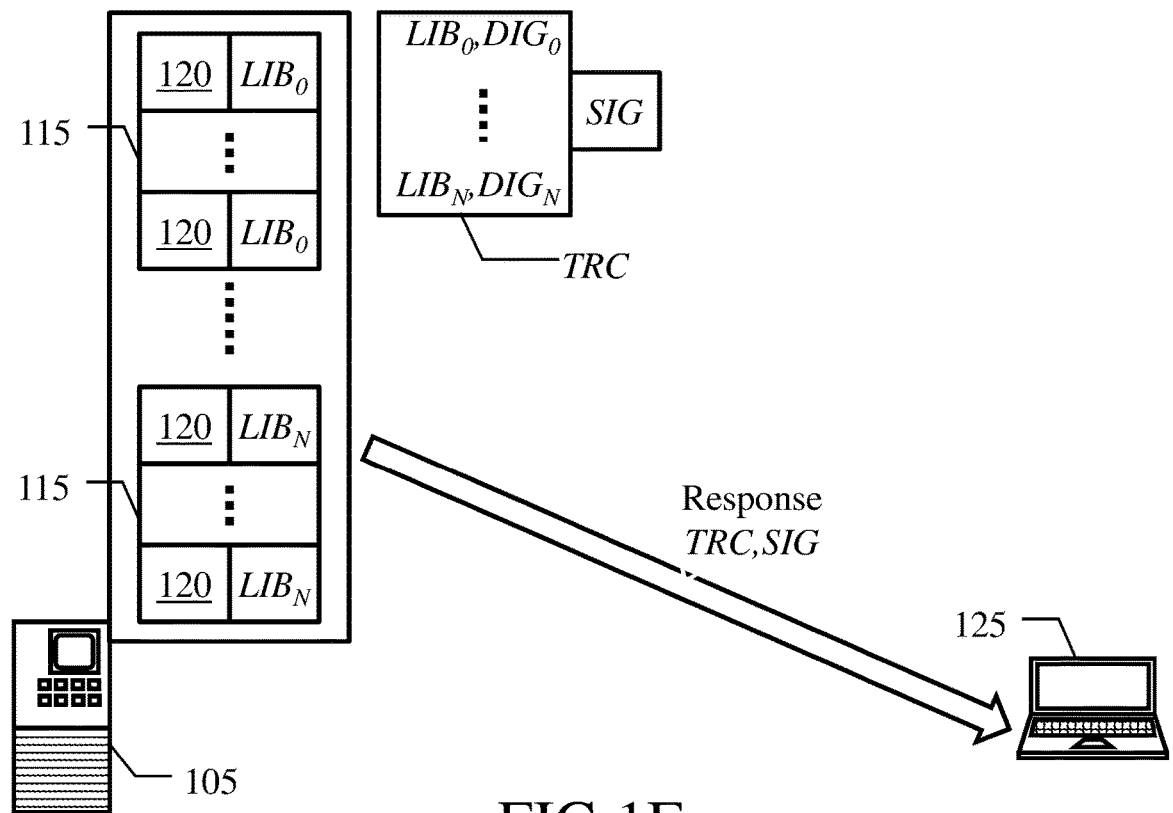

Moving to FIG. 1E, server 105 returns a corresponding response to the call as usual to client 125. However, in the solution according to an embodiment of the present disclosure, the server further returns the tracking information TRC of software program 110 and its digital signature SIG in association to the response.

Figure 1F:
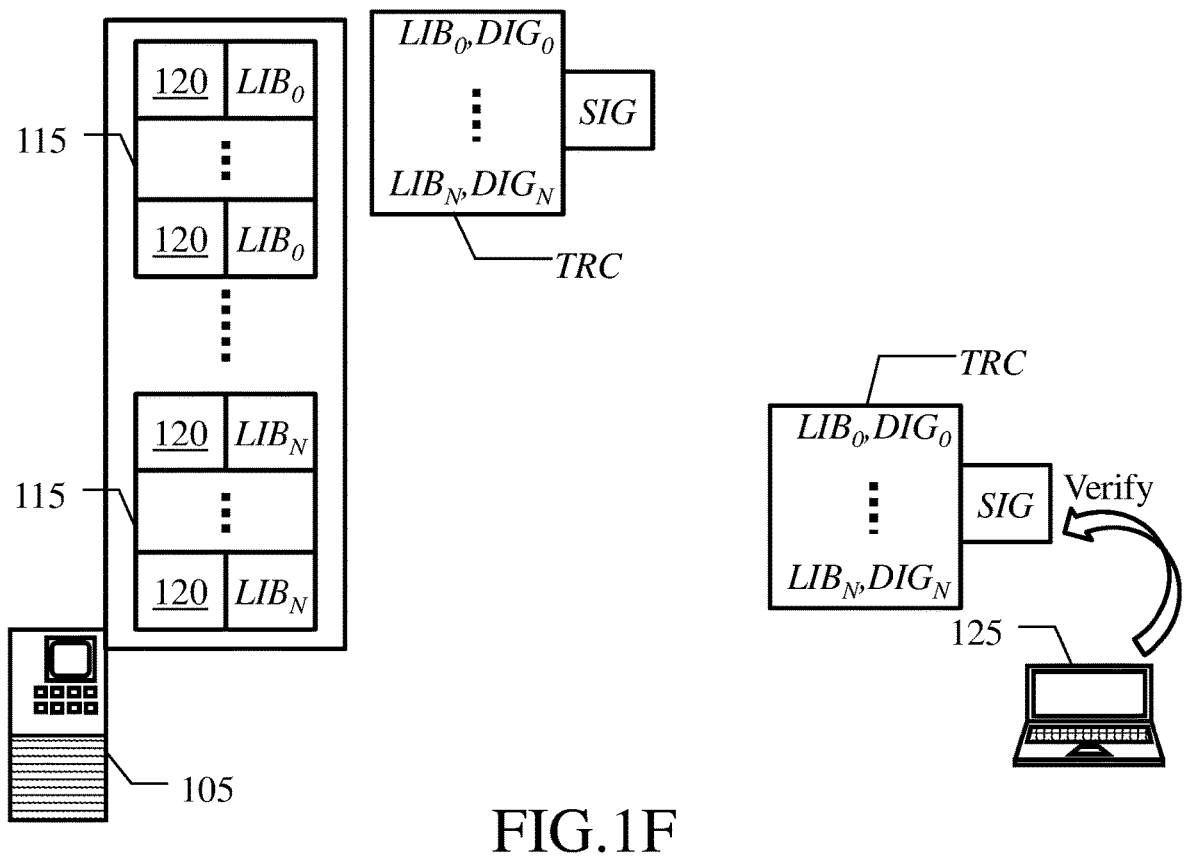

Moving to FIG. 1F, client 125 verifies the digital signature SIG of the tracking information TRC. In this way, client 125 verifies that the tracking information TRC has not been corrupted (integrity) and that it has been actually provided by server 105 (authenticity).

Figure 1G:
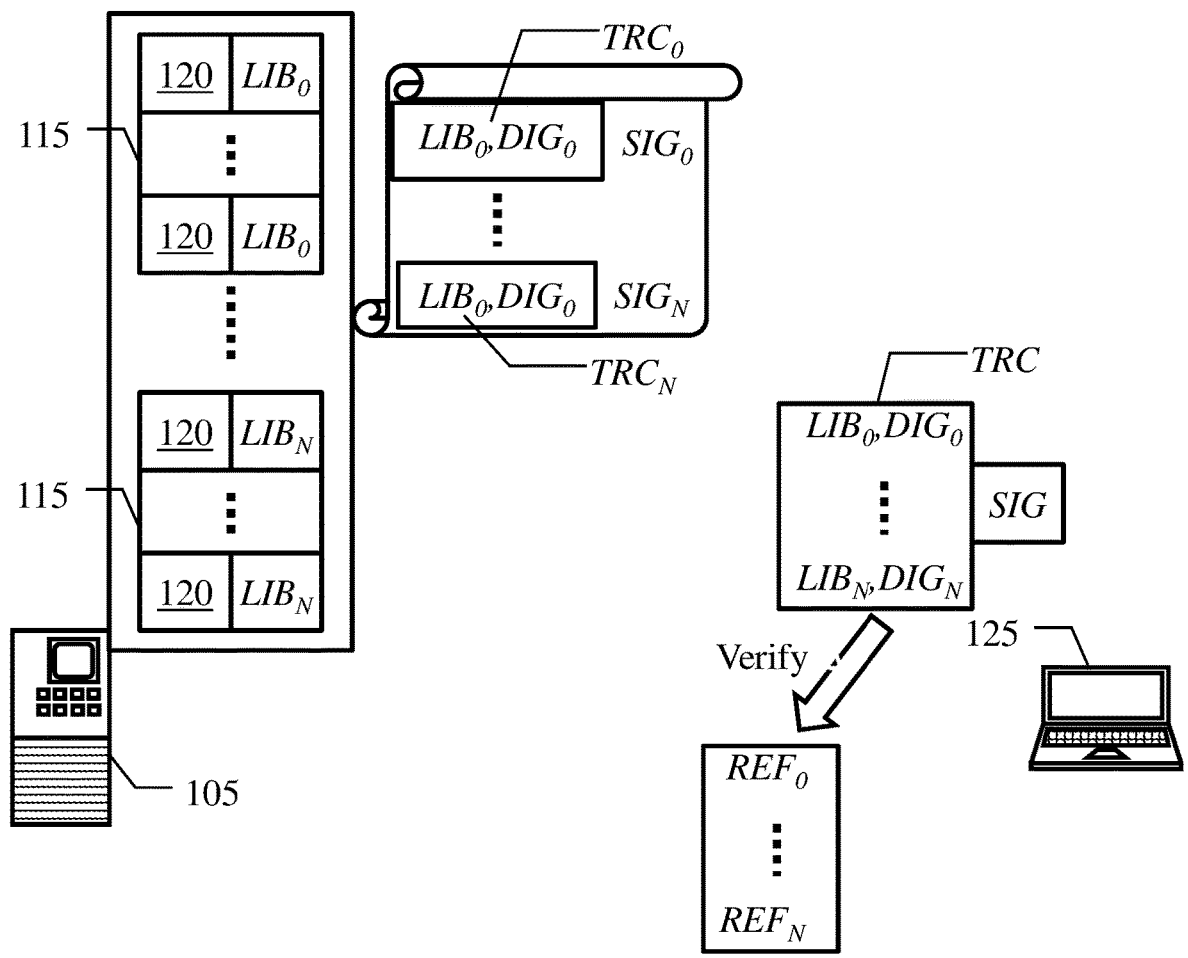

Moving to FIG. 1G, client 125 verifies the current digests $DIG_i$ of common libraries 115 that are used by software program 110, extracted from the tracking information TRC, against reference values of the digests (reference digests) $REF_i$ of common libraries 115, retrieved according to the corresponding common library identifiers $LIB_i$ extracted from the tracking information TRC (for example, obtained from corresponding open-source already providing them for verifying a consistency of any download of common libraries 115). In this way, client 125 verifies that software program 110 actually uses common libraries 115 (names and versions) that are declared in the (verified) tracking information TRC.

The above-mentioned solution allows assessing a quality of the software programs. For example, it is possible to know whether the software programs use upgraded versions of the common libraries that are abreast of technological evolution and discovered threats. As a consequence, in case the quality of some common libraries is not acceptable (for example, when their versions are too outdated), corresponding warnings may be provided (down to refuse using the responses returned by the software programs using these common libraries). It is then possible to avoid using not enough functional common libraries and/or too much vulnerable common libraries that may cause corresponding execution errors and/or security exposures. This substantially reduces the risk of unexpected behaviors and/or attacks exploiting known vulnerabilities, and then of corresponding damages.

The desired result does not depend on the software programs. Therefore, the software programs do not need to add their own logic to report the corresponding tracking information (with a consequent saving of development cost/time). Moreover, once the server is trusted, it is possible to assess that the tracking information is genuine (since it may not have been tampered by the software programs themselves).

Figure 2:
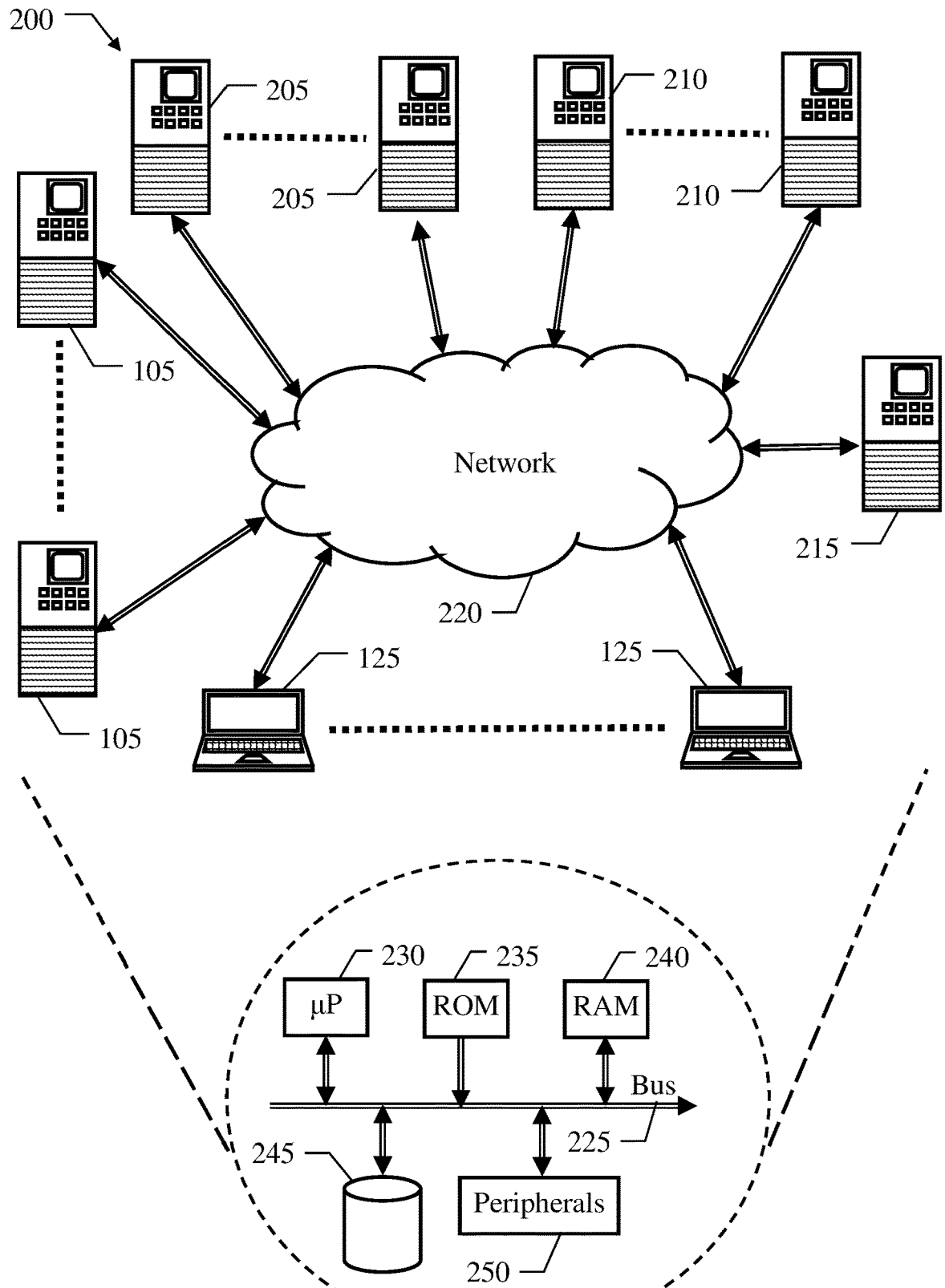
FIG. 2 shows a schematic block diagram of an information technology infrastructure that may be used to implement the solution according to an embodiment of the present disclosure.

With reference now to FIG. 2, a schematic block diagram is shown of an information technology infrastructure 200 that may be used to implement the solution according to an embodiment of the present disclosure.

Information technology infrastructure 200 comprises multiple server computing systems, or simply servers, and particularly one or more instances of the above-mentioned server providing the software programs, differentiated as providing servers 105, one or more publishing servers 205 publishing the common libraries, one or more producing servers 210 producing the software programs and a signing server 215, or more, offering a digital signing service. Moreover, infrastructure 200 comprises one or more instances of the above-mentioned client 125. Providing servers 105, publishing servers 205, producing servers 210, signing server 215 and clients 125 communicate among them over a (telecommunication) network 220 (for example, of global type based on the Internet).

In a specific implementation, the providing servers 105 belong to one or more cloud providers, each providing a pool of (cloud) services being implemented by shared computing resources that may be provisioned, configured and released very rapidly; the computing resources (generally of the virtual type, that is, emulations by software of computing resources of physical type) are allocated upon request to users of the cloud provider, so that each user has the sole control of these computing resources (which may then be used exactly as if they were dedicated to the user). A backend sub-system actually implementing the cloud services is not accessible from the outside, so that the users are completely agnostic about its location and configuration. The services may be provided according to several service models, particularly, Infrastructure as a Service (IaaS), Platform as a Service (PaaS), Software As a Service (SaaS) and Network as a Service (NaaS). Moreover, the services may be provided according to different deployment models, particularly, public cloud (that is, for general public), private cloud (that is, for a single organization), community cloud (that is, for several organizations) or hybrid cloud (based on a combination of different deployment models).

Publishing servers 205 belong to one or more open-source organizations, which publish the common libraries as open-source code. In general, the open-source code is a software that is released with an (open-source) license allowing its source code to be used, modified and distributed (generally free of charge). The open-source license poses no, or at least substantially relaxed, restrictions on these rights (for example, only requesting to preserve a copyright notice, to redistribute the software under the same open-source license and so on). This results in a development model of the software that is decentralized, since it promotes a collaborative approach based on contribution of multiple participants of a corresponding community.

Producing servers 210 belong to one or more software producers, which produce the software programs as proprietary software. In general, a proprietary software is a software for which its owner reserves corresponding exclusive rights. In this case, the source code of the proprietary software is not published (being at most made available only to its licensees). The proprietary software may be released under different terms and conditions, for example, as commercial product, freeware, shareware and so on.

Signing server 215 belongs to an entity that offers a digital signature service. The entity is a trusted authority that is generally trusted by the users of clients 125 (for example, a producer of a runtime environment of the software programs).

Clients 125 belong to users of the cloud providers. Clients 125 are used to invoke the services offered by the cloud providers via their providing servers 105.

Each of the above-mentioned computing systems (that is, providing servers 105, publishing servers 205, producing servers 210, signing server 215 and clients 125) comprises several units that are connected among them through a bus structure 225 at one or more levels (with an architecture that is suitably scaled according to the type of computing system 105, 205-215, 125). Particularly, a microprocessor (μP) 230, or more, provides a logic capability of computing system 105, 205-215, 125; a non-volatile memory (ROM) 235 stores basic code for a bootstrap of computing system 105, 205-215, 125 and a volatile memory (RAM) 240 is used as a working memory by the microprocessor 230. Computing system 105, 205-215, 125 is provided with a mass-memory 245 for storing programs and data (for example, storage devices of corresponding data centers wherein they are implemented for the providing/publishing/producing/signing servers 105, 205-215 and corresponding SSDs for clients 125). Moreover, computing system 105, 205-215, 125 comprises a number of controllers for peripherals, or Input/Output (I/O) units, 250; for example, the peripherals 250 of each server 105, 205-215 comprise a network adapter for plugging server 105, 205-215 into the corresponding data center and then connecting it to a console of the data center for its control (for example, a personal computer, also provided with a drive for reading/writing removable storage units, such as of USB type) and to a switch/router sub-system of the data center for its communication with the network 220, whereas the peripherals 250 of each client 125 comprise a keyboard, a mouse, a monitor, a network adapter for connecting to the network 220 and a drive for reading/writing removable storage units (such as of USB type).

Figure 3:
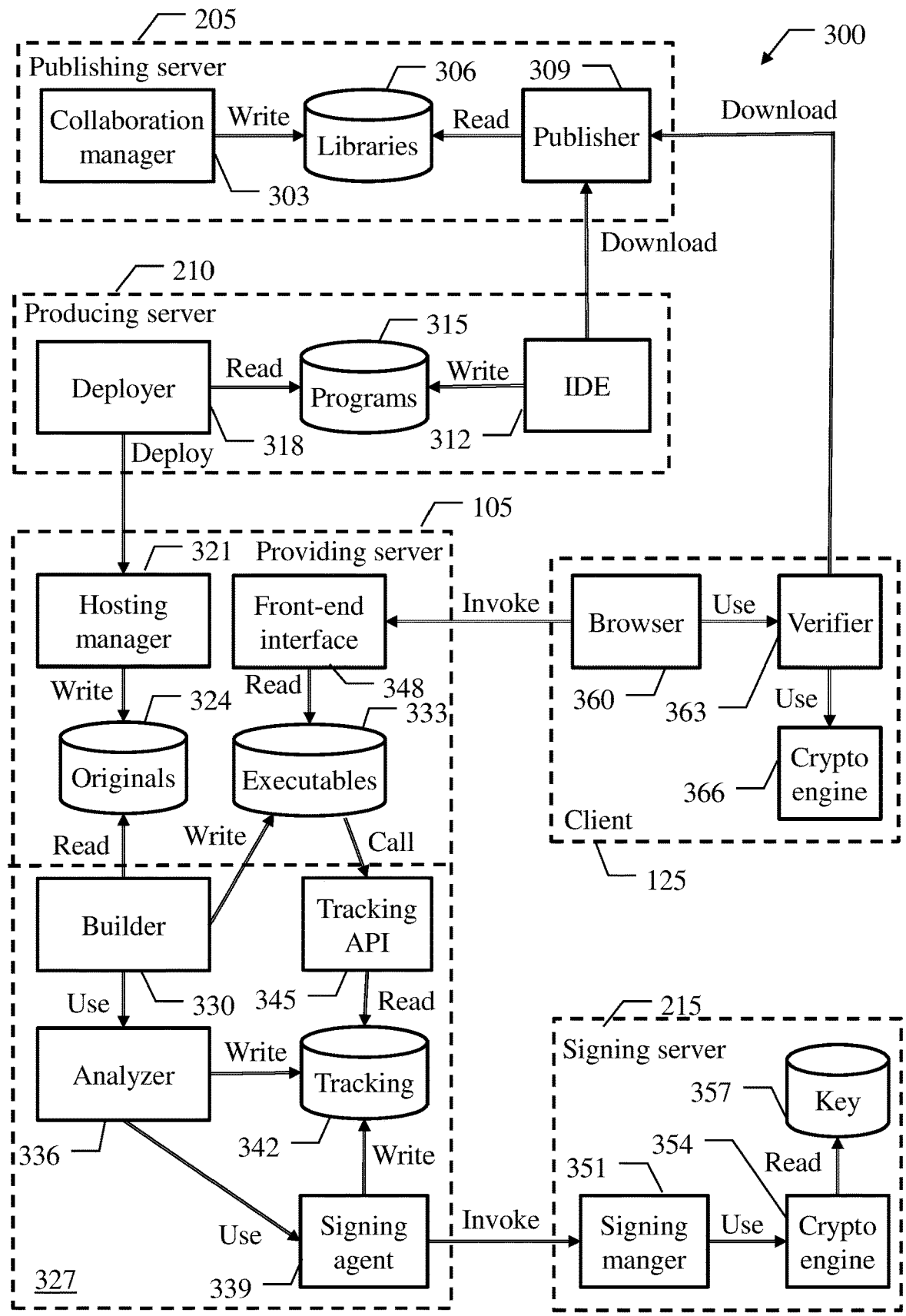
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each computing system (publishing servers 205, producing servers 210, providing servers 105, signing server 215 and clients 125) when the programs are running, together with an operating system and other application programs not directly relevant to the solution of the present disclosure (thus omitted in the figure for the sake of simplicity). The programs are initially installed into the mass memory, for example, from removable storage units or from the Internet. In this respect, each program may be a module, segment or portion of code, which comprises one or more executable instructions for implementing the specified logical function.

Starting from each publishing server 205 (only one shown in the figure), it comprises the following components. A collaboration manager 303 manages the collaborative development of the corresponding common libraries by the participants of their community. The collaboration manager writes a common library repository 306 that contains the common libraries. For example, common library repository 306 has an entry for each version of each common library.

The entry stores the source code of the common library as defined by its software components. Moreover, the entry stores corresponding metadata, which indicate name, version and a reference value of the digest (reference digest) of the common library. A publisher 309 publishes the common libraries and their metadata. Publisher 309 reads common library repository 306.

Moving to each producing server 210 (only one shown in the figure), it comprises the following components. An Integrated Development Environment (IDE) 312 provides a single comprehensive environment for several utilities (with similar user interfaces) relating to different tasks of a development process of the software programs (for example, editing, debugging, versioning and so on). IDE 312 accesses publisher 309 of publishing servers 205 for downloading any desired common libraries. IDE 312 writes a software program repository 315 that contains the software programs. For example, software program repository 315 has an entry for each software program. The entry stores the source code of the software program (comprising the common libraries used by it, being either embedded in the software program or referenced by corresponding links to local copies thereof). A deployer 318 deploys the software programs. Deployer 318 reads the software programs repository 315.

Moving to each providing server 105 (only one shown in the figure), it comprises the following components. A hosting manager 321 manages a hosting of the software programs. Hosting manager 321 is accessed by deployer 318 of producing servers 210 to deploy the corresponding software programs. Hosting manager 321 writes an original program repository 324 that contains a local copy of the software programs in the original form provided by producing servers 210. A runtime environment 327 provides the services being required to run the software programs, for example, a Java Runtime Environment (JRE). As far as relevant to the present disclosure, runtime environment 327 comprises the following components. A builder 330 builds the software programs in an executable form for their execution on runtime environment 327 (compiled in Java bytecode for execution by a Java Virtual Machine (JVM) in the example at issue). Builder 330 reads the original program repository 324; moreover, builder 220 writes an executable program repository 333, which contains the software programs in executable form. In the solution according to an embodiment of the present disclosure, runtime environment 327 is instrumented as follows. Particularly, builder 330 uses analyzer 336 that in turn uses signing agent 339. Analyzer 336 analyzes the software programs to determines the common libraries that are used by them. Signing agent 339 generates digital signatures of information via the (external) digital signing service offered by signing server 215; in this way, no private key has to be stored in providing server 105 (thereby avoiding the need of disseminating it with possible security exposures). Both the analyzer 336 and signing agent 339 write a tracking repository 342 that contains information used to track the software programs. For example, tracking repository 342 has an entry for each software program. The entry stores tracking information of the software program and its digital signature. The tracking information comprises a common library list of the common libraries that are used by the software program; for each common library, the common library list comprises the common library identifier (for example, name and version) of the common library and the current digest of the common library (as calculated by the analyzer from its software components). Runtime environment 327 also exposes a tracking Application Program Interface (API) 345, which is called by the software programs (in the executable program repository 333) to obtain the corresponding tracking information with its digital signature. Providing server 105 further comprises a front-end interface 348 that is used to call the software programs (for example, by invoking the cloud services implemented by them). The front-end interface 348 reads the executable program repository 333.

Moving to signing server 215, it comprises the following components. A signing manager 351 implements a digital signing service based on a Public Key Infrastructure (PKI). As far as relevant to the present disclosure, signing manager 351 is invoked by signing agent 339 of providing servers 105 to generate the digital signatures of the tracking information of the software programs. Signing manager 351 uses a cryptographic engine 354 that performs cryptographic operations. The cryptographic engine 354 reads a key repository 357. The key repository 357 stores (in a protected way) a private key of signing server 215. Moreover, the key repository 357 stores a digital certificate of signing server 215; the digital certificate contains identification information of signing server 215, its public key and a name of a certification authority that has issued the pair of public/private keys of signing server 215 (which digital certificate is digitally signed by the certification authority thereby certifying an identify of an entity associated with signing server 215).

Moving to each client 125 (only one shown in the figure), it comprises the following components. A browser 360 is used to surf the Internet; particularly, as far as relevant to the present disclosure, browser 360 is used to access the front-end interface 348 of the providing servers 105 to invoke the corresponding services. Browser 360 uses a verifier 363 to verify the software programs implementing the invoked services. Verifier 363 accesses publisher 309 of publishing servers 205 to download the metadata of the corresponding common libraries. Verifier 363 in turn uses a cryptographic engine 366 that performs cryptographic operations.

Figure 4A:
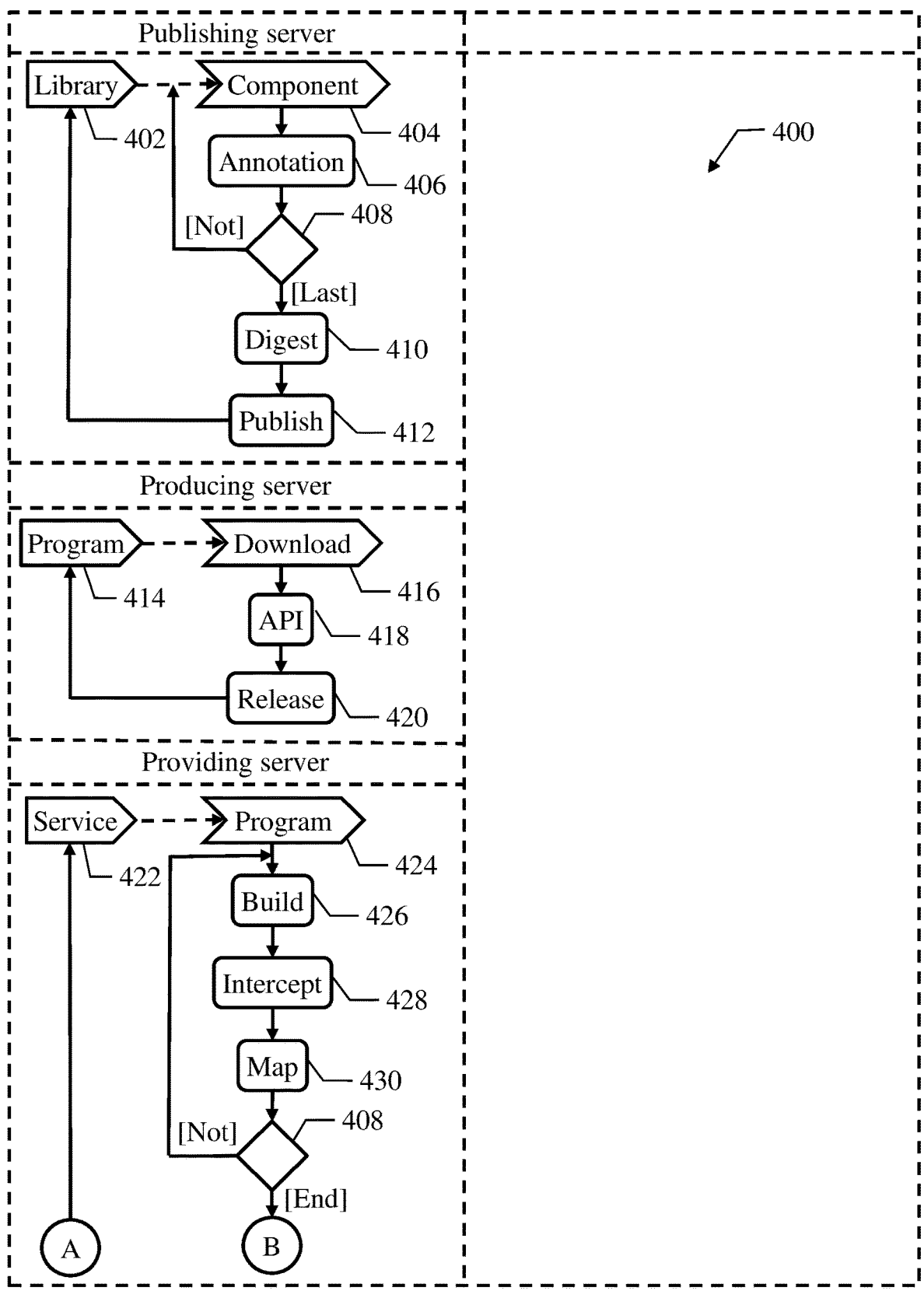
FIG. 4A-FIG. 4C show an activity diagram describing the flow of activities relating to an implementation of the solution according to an embodiment of the present disclosure.
Figure 4B:
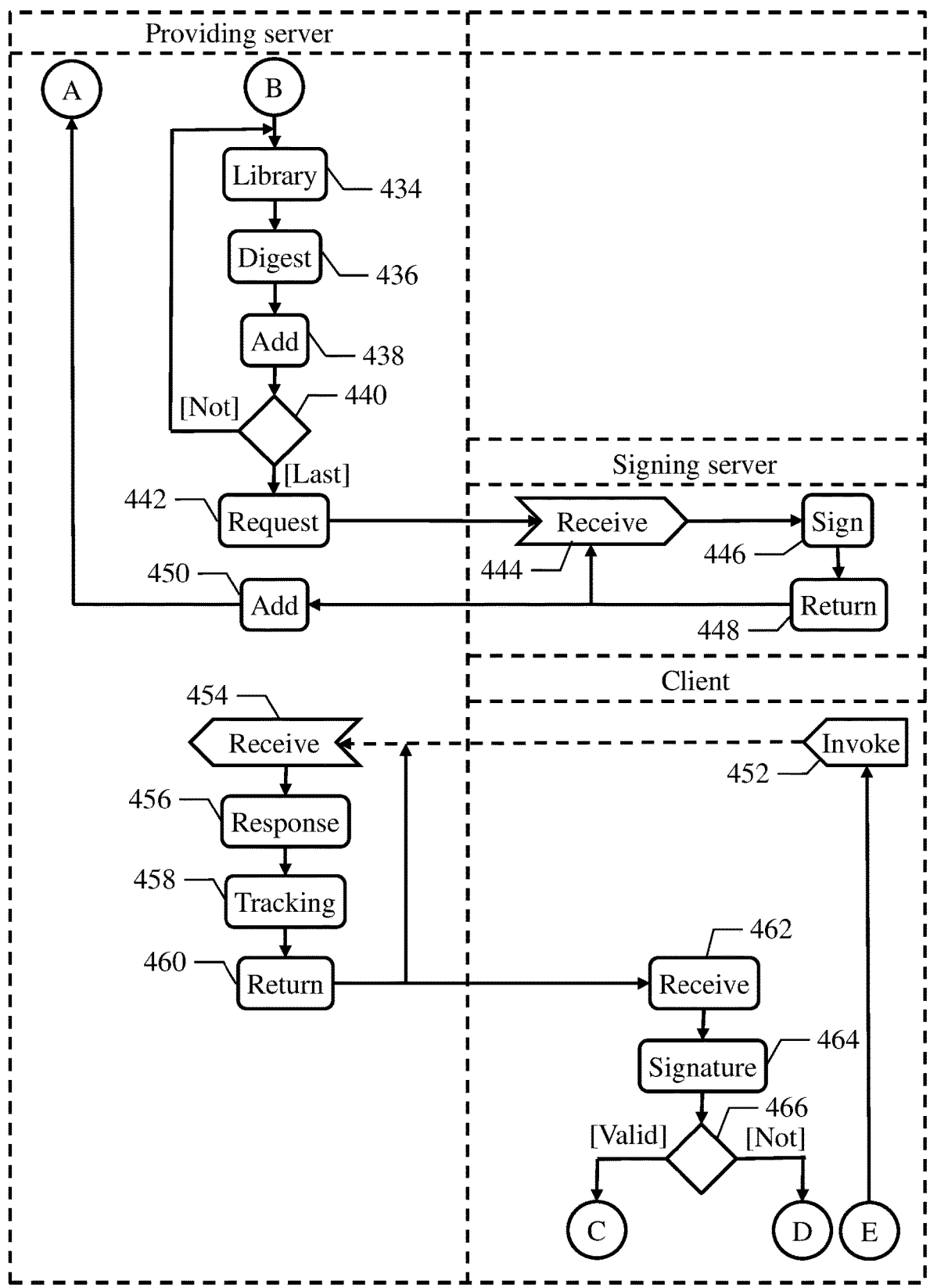
Figure 4C:
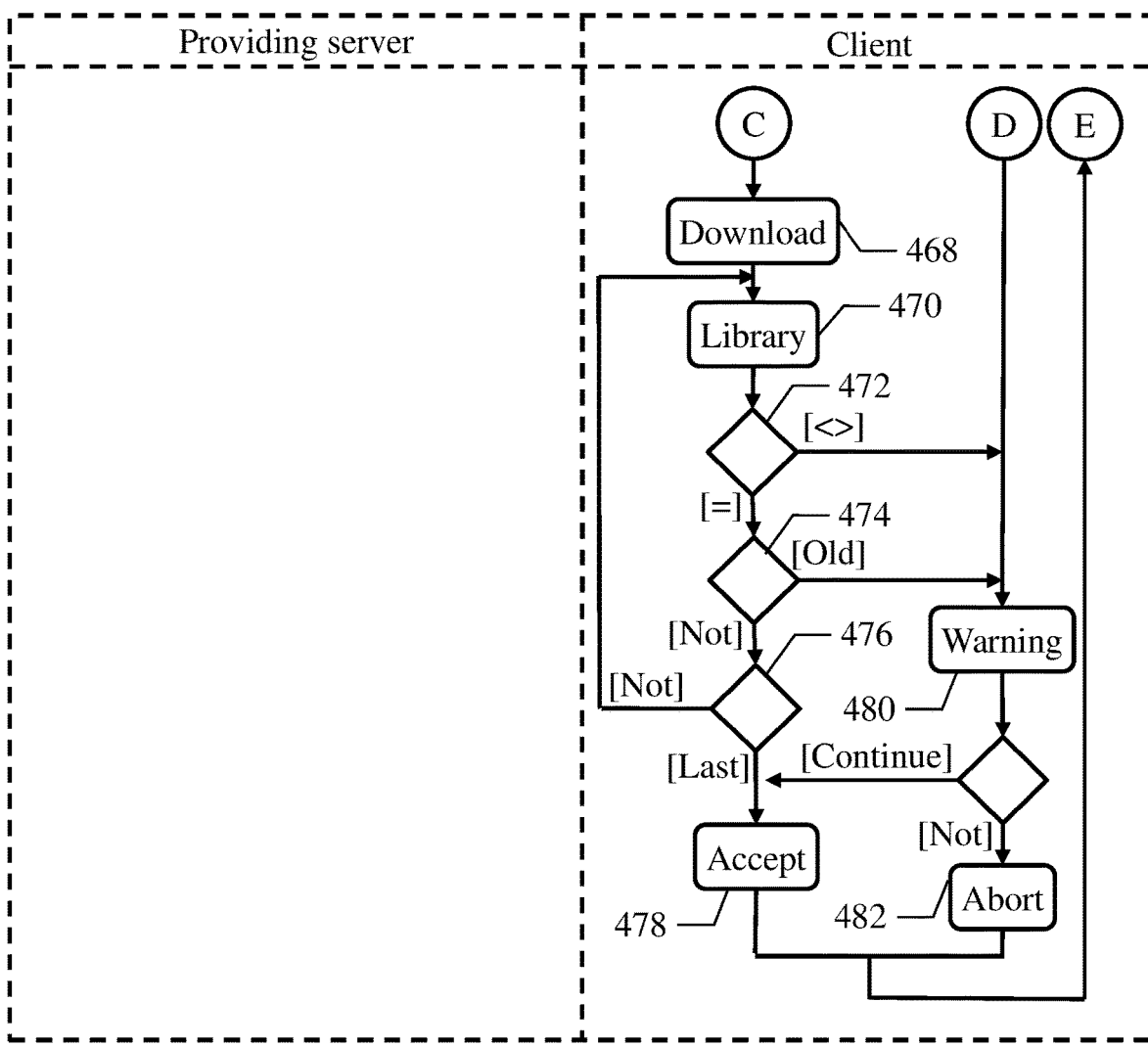

With reference now to FIG. 4A-FIG. 4C, an activity diagram is shown describing the flow of activities relating to an implementation of the solution according to an embodiment of the present disclosure.

Particularly, the diagram represents an exemplary process that may be used to track software usage with a method 400. In this respect, each block may correspond to one or more executable instructions for implementing the specified logical function on the corresponding computing system (publishing server, producing server, providing server, signing server or client).

The process passes from block 402 to block 404 in the swim-lane of a generic publishing server whenever a new common library is released (for the first time or as an upgrade of a previous version thereof), by adding it to the corresponding repository. In response thereto, the collaboration manager takes a (current) software component of the new common library into account (starting from a first one in any arbitrary order). The collaboration engine at block 406 decorates the software component with the corresponding common library identifier. This result is achieved by adding a Java annotation to the software component with a pre-defined keyword (such as "tracking") and name/value pairs for the name of the new common library ("name") and its version ("version"); for example, the java annotation for a new common library called "myLibrary" of version "my Version" may be:

@tracking(name=myLibrary, version=myVersion).

The collaboration manager at block 408 verifies whether a last software component has been processed. If not, the process returns to block 404 to repeat the same operations for a next software component. Conversely, once all the software components has been processed, the collaboration manager at block 410 calculates the (reference) digest of the new common library. For example, the collaboration manager calculates corresponding hash values of the software components in alphabetic order of their file names and then a hash value of a concatenation of these hash values. The publisher at block 412 publishes the new common library and their metadata (name, version and reference digest), by adding them to the corresponding repository. The process the returns to block 402 waiting for the release of a next common library.

Moving to the swim-lane of a generic producing server, the process passes from block 414 to block 416 whenever a new software program is released (for the first time or as an upgrade of a previous version thereof). In this phase, as usual the IDE downloads the required common libraries from the corresponding publishing servers. In the solution according to an embodiment of the present disclosure, the IDE at block 418 adds a call for the tracking API to the software program. The IDE at block 420 releases the software program so obtained by adding it to the corresponding repository. The process then returns to block 414 waiting for the release of a next software program.

Moving to the swim-lane of a generic providing server, the process passes from block 422 to block 424 whenever a new service is released (for the first time or as an upgrade of a previous version thereof) in response to the deployment of the corresponding software program from its producing server to the hosting manager (which adds the software program to the original program repository). The builder at block 426 builds the software program in executable form as usual from its original form retrieved from the corresponding repository (by compiling it into Java bytecode). In the solution according to an embodiment of the present disclosure, during this process the analyzer at block 428 intercepts any relevant Java annotation (keyword "tracking") being comprised in the software components of the common libraries used by the software program. In response thereto, the analyzer at block 430 accordingly populates a tracking map (initially empty). Particularly, if necessary the analyzer adds an entry to the tracking map with the name/version of the common library extracted from the Java annotation; in any case, the analyzer adds a name of the software component containing the Java annotation to the entry. The analyzer at block 432 verifies whether the building of the software program (in its executable form) has been completed. If not, the process returns to block 426 to continue the building of the software program. Conversely, once the builder has completed the building of the software program (with its addition to the executable program repository) a loop is entered at block 434, wherein the analyzer takes a (current) common library used by the software program into account, as indicated in the tracking map (starting from a first one in any arbitrary order). The analyzer at block 436 calculates the (current) digest of the common library as above. Particularly, the analyzer retrieves the list of the software components of the common library from the corresponding entry of the tracking map, calculates corresponding hash values of the software components in alphabetic order of their file names and then a hash value of the concatenation of these hash values. The analyzer at block 438 adds a new entry for the common library to the common library list defining the tracking information of the software program (initially empty), which new entry contains the common library identifier (name/version) extracted from the corresponding entry of the tracking map and the current digest just calculated. The analyzer at block 440 verifies whether a last common library has been processed. If not, the process returns to block 434 to repeat the same operations for a next common library. Conversely, once all the common libraries have been processed, the analyzer at block 442 requests the signing agent to obtain the digital signature of the tracking information of the software program defined by the common library list. The signing agent then submits a corresponding signing request (comprising the tracking information) to signing server. Moving to the swim-lane of signing server, the process passes from block 444 to block 446 as soon as the signing manager (being in a listening condition for it) receives any signing request (from the providing server at block 442 in the example at issue). In response thereto, the signing manager commands the cryptographic engine to generate the digital signature of the tracking information (extracted from the signing request), by calculating its hash value and then encrypting it with the private key of the signing server (retrieved from the corresponding repository). The signing manager at block 448 returns the digital signature of the tracking information to the providing server. The process then goes back to block 444 waiting for a next signing request. Referring again to the swim-lane of the providing server, the analyzer at block 450 receives the digital signature of the tracking information from the signing server (being in a listening condition for it from block 442). In response thereto, the analyzer adds a new entry to the tracking repository for the software program, with the tracking information and its digital signature. The process then returns to block 422 waiting for the release of a next service.

Moving to the swim-lane of a generic client, the browser at block 452 submits a service invocation for a generic service offered by the providing server (for example, by calling a corresponding REST API exposed by its front-end interface). The front-end interface receives the service invocation at block 454 in the swim-lane of the providing server. In response thereto, the software program implementing the service (in its executable form) at block 456 generates a corresponding service response as usual. In the solution according to an embodiment of the present disclosure, the software program at block 458 also calls the tracking API exposed by the runtime environment for receiving the tracking information of the software program with its digital signature (retrieved from the tracking repository). The front-end interface at block 460 returns the service response to the client (for example, in the form of a HTTP response) in association with the tracking information and its digital signature. For example, the tracking information and the digital signature are embedded in an (additional) response header of the HTTP response. The process then goes back to block 454 waiting for a next service invocation. Referring again to the swim-lane of the client, the browser at block 462 receives the service response with the tracking information and its digital signature from the providing server (being in a listening condition for it from block 452). In response thereto, the browser commands the verifier to verify the service response. Particularly, the verifier at block 464 verifies (via the cryptographic engine) that the digital signature of the tracking information is valid. For this purpose, the cryptographic engine downloads the digital certificate of the signing server (for example, pre-defined or indicated in association with the service response) and verifies that it is active; moreover, the cryptographic engine decrypts the digital signature with the public key of the signing server (extracted from its digital certificate), calculates the hash value of the tracking information and verifies that the decrypted/calculated values match. The flow of activity branches at block 466 according to a result of this verification. If all the above-mentioned conditions are met (meaning that the tracking information is genuine), the verifier now verifies the digests of the common libraries indicated in the tracking information. For this purpose, the verifier at block 468 downloads the reference digests of the common libraries and an indication of their last versions from the corresponding publishing servers (for example, retrieved from the names of the common libraries or indicated in the tracking information). A loop is then entered at block 470, wherein the verifier takes a (current) common library into account (starting from a first one in any arbitrary order). The verifier at block 472 compares the current digest of the common library (extracted from the tracking information) with its reference digest (just downloaded). If the current digest is equal to the reference digest (meaning that the common library is genuine), the verifier at block 474 now compares the current version of the common library (extracted from the tracking information) with its last version (just downloaded). If the current version is equal to the last version (meaning that the common library is up-to-date), the result of the verification of the common library is positive. In this case, the verifier at block 476 verifies whether a last common library has been processed. If not, the process returns to block 470 to repeat the same operations for a next common library. Conversely, once all the common libraries have been processed (meaning that they have all been successfully verified), the verifier at block 478 returns a positive result of the verification of the service response to the browser, which then accepts the service response for its use as usual. The process instead continues to block 480 from block 466 if the digital signature is not valid, from block 472 if the current digest differs from the reference digest or from block 474 if the current version is older than the last version. In this case, the verifier returns a negative result of the verification of the service response to the browser (together with an indication of its cause). The process branches at block 482 according to a reaction to this negative result. For example, the browser may display a corresponding warning message (indicating the cause of the negative result of the verification of the service response). The user may then decide how to proceed. If the user decides to continue using the service response despite the negative result of its verification, the process continues to block 478 to accept the service response as above; for example, this may happen when the current version of a common library is only slightly outdated but this does not pose serious security exposures. Conversely (for example, when the digital signature is not valid or the current digest of a common library differs from its reference digest), the browser at block 484 aborts the service invocation by refusing its service response (then entering an error condition). The process returns from block 478 or from block 482 to block 452 waiting for a next service invocation.

Figure 5:
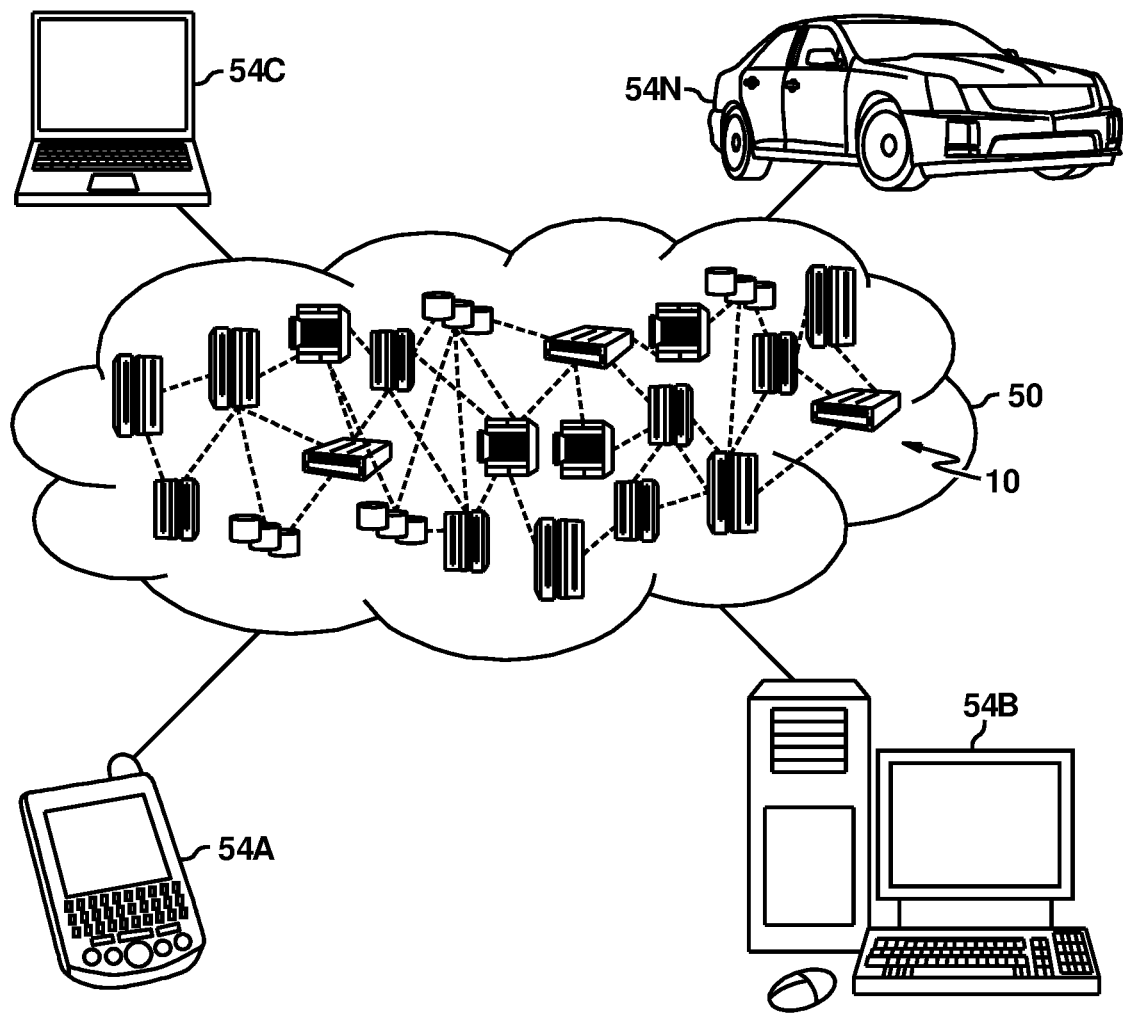
FIG. 5 depicts a cloud computing environment according to an embodiment of the present disclosure.

With reference now to FIG. 5, a cloud computing environment is depicted according to an embodiment of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to the FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (for example, using a web browser).

Figure 6:
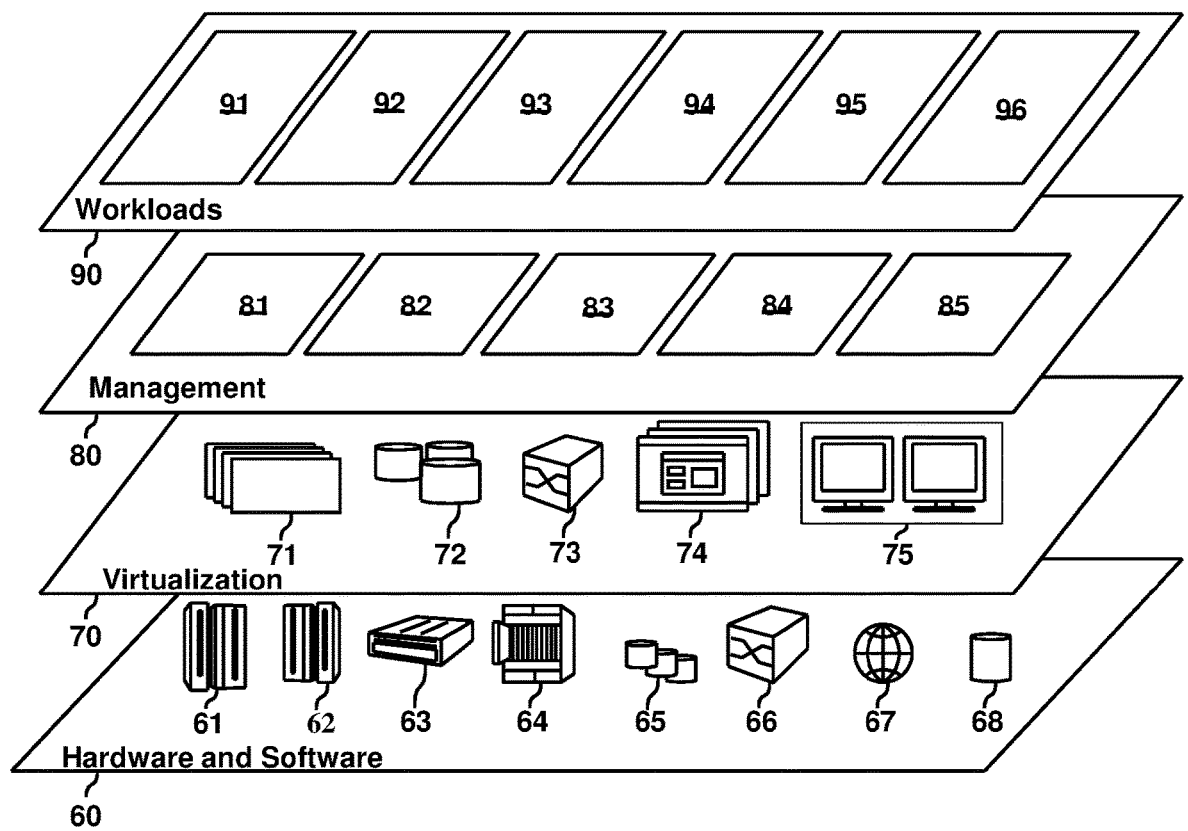
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recertification management 96.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (that is, not limited to the recited items), the terms based on, dependent on, according to, function of and the like should be intended as a non-exclusive relationship (that is, with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for tracking software usage. However, the method may be used for any purpose (for example, for preventing usage of potentially dangerous software, such as non-genuine, outdated and the like software, for logging information about used software and so on).

In an embodiment, the method comprises the following steps under the control of a server computing system. However, the server computing system may be of any type (see below) and the method may be performed by any module(s) thereof (for example, the runtime environment, the hosting manager, the front-end interface and so on).

In an embodiment, the method comprises determining (by the server computing system) corresponding one or more common libraries being used by each of one or more software programs running on the server computing system. However, the software programs may be in any number and of any type (for example, implementing services, procedures and the like, written in any language, released with any license and so on); moreover, each software program may have any number and type of common libraries (for example, open-source packages, proprietary products and so on) that are used in any way (for example, embedded statically, linked dynamically and so on).

In an embodiment, the common libraries are determined according to corresponding common library identifiers associated with one or more software components of each of the common libraries being indicative of the common libraries wherein the software components are comprised. However, each common library may comprise any number and type of software components (for example, classes, routines, functions and so on) with any type of common library identifiers (for example, each indicating name, version, publisher and so on of the corresponding common library) that are associated therewith in any way (for example, in annotations, descriptors and so on).

In an embodiment, the method comprises calculating (by the server computing system) corresponding current digests of the common libraries each based on the software components of the common library indicated by the corresponding common library identifiers. However, the current digests may be calculated in any way (for example, by using any cryptographic/standard hash function, calculating the hash values of the software components and then the hash value of their concatenation, the Merkle tree root of the software components and so on).

In an embodiment, the method comprises obtaining (by the server computing system) a digital signature of tracking information of each of the software programs. However, the digital signature may be obtained in any way (for example, from a remote service, locally and so on).

In an embodiment, the tracking information of the software program comprises the common library identifiers of the corresponding common libraries and the current digests thereof. However, the tracking information may comprise any additional information, down to none (for example, name and version of the software program, its producer and so on).

In an embodiment, the method comprises receiving (by the server computing system) one or more calls for the software programs. However, the calls may be in any number and of any type (for example, service invocations, remote commands, messages, with any format, compliant with any specification and so on).

In an embodiment, the method comprises returning (by the computing system) a response to each of the calls in association with the corresponding tracking information and digital signature. However, the response may be of any type (according to the call) and the tracking information and digital signature may be returned in association therewith in any way (for example, in a header, a custom field, a separate message and the like, added thereto directly by the software program that retrieves it via the tracking API, by the server computing system when it returns the response and so on).

Further embodiments provide additional advantageous features, which may however be omitted at all in a basic implementation.

In an embodiment, the common library identifiers comprise names and current levels of the corresponding common libraries. However, the names may be of any type (for example, specific names qualified by names of correspond publishers, unique codes and so on) and the current levels may be of any type (for example, versions, releases, service packs and so on).

In an embodiment, the method is performed under the control of a runtime environment of the server computing system on which the software programs run. However, the runtime environment may be of any type (for example, a JRE, a node.js and the like, for any language, with the method that is performed when the software programs are built, compiled, interpreted and so on).

In an embodiment, the method comprises receiving (by the server computing system) a tracking request from the corresponding software program in response to each of the calls. However, the tracking request may be received in any way (for example, as soon as the software program is called, before it returns the response and so on).

In an embodiment, the method comprises returning (by the server computing system) the corresponding tracking information and digital signature to the software program in response to the tracking request to cause the software programs to add the tracking information and digital signature to the corresponding response. However, the possibility is not excluded of performing the same operation by the front-end interface, a dedicated module serving all the software programs and so on).

In an embodiment, the method comprises obtaining (by the server computing system) the digital signature of the tracking information of each of the software programs from a signing computing system. However, the signing computing system may be of any type (for example, belonging to a producer of the runtime environment, a corresponding cloud provider, a generic certification authority and so on).

In an embodiment, the software programs implement corresponding services. However, the services may be of any type (for example, standard, micro, nano and the like services, of cloud, SOAP and the like type, and so on).

In an embodiment, the services are cloud services. However, the cloud services may be of any type (for example, IaaS, PaaS, SaaS or NaaS, public, hybrid or private, and so on).

An embodiment provides a further method for tracking software usage. However, the method may be used for any purpose (see above).

In an embodiment, the method comprises the following steps under the control of a client computing system. However, the client computing system may be of any type (see below) and the method may be performed by any module(s)

thereof (for example, the browser, the operating system, an application program and so on).

In an embodiment, the method comprises submitting (by the client computing system) a call to a server computing system for a software program using one or more common libraries each comprising one or more software components. However, the call may be submitted to any server computing system in any way and for any software program using any number and type of software components in any way (see below).

In an embodiment, the method comprises receiving (by the client computing system) a response to the call in association with tracking information corresponding to the common libraries and a digital signature of the tracking information from the server computing system. However, the response may be of any type and the tracking information and digital signature may be received in association therewith in any way (see above).

In an embodiment, the tracking information of the common libraries comprises corresponding common library identifiers and current digests based on the corresponding software components. However, the tracking information may comprise any additional information, down to none (see above).

In an embodiment, the method comprises verifying (by the client computing system) the digital signature. However, the digital signature may be verified in any way (for example, locally on the client computing system, remotely via an external service and so on).

In an embodiment, the method comprises verifying (by the client computing system) the current digests against corresponding reference digests retrieved according to the common library identifiers. However, the reference digests may be retrieved in any way (for example, downloaded from publishing computing systems of the common libraries, from a computing system of an authoritative source certifying them and so on).

In an embodiment, the method comprises tracking (by the client computing system) the common libraries according to a result of said verifying the digital signature and said verifying the current digests. However, this result may be used in any (for example, by enabling usage of the response accordingly, by outputting a warning message in case of a negative result and so on).

Further embodiments provide additional advantageous features, which may however be omitted at all in a basic implementation.

In an embodiment, the method comprises enabling (by the client computing system) a usage of the response according to said tracking the common libraries. However, the usage of the response may be enabled in any way (for example, automatically, semi-automatically, manually and so on) according to the tracking of the common libraries (for example, based on the verification of the digital signature, the matching of the current digests with the reference digests, a level of the common libraries and so on).

In an embodiment, the method comprises receiving (by the client computing system) the tracking information comprising corresponding names and current levels of the common libraries. However, the names and the levels may be of any type (see above).

In an embodiment, the method comprises retrieving (by the client computing system) an indication of corresponding last levels of the common libraries. However, the indication of the last levels may be retrieved in any way (for example, either the same or different with respect to the reference digests).

In an embodiment, the method comprises enabling (by the client computing system) the usage of the response according to a comparison between the current level and the last level of each of the common libraries. However, the usage of the response may be enabled in any way according to this comparison (for example, enabling the usage only when the current level is equal to the last level, outputting a warning when a different between the last level and the current level is within a threshold, such as different service packs of a same release, difference releases of a same version and the like, preventing the usage of the response when the difference exceeds the threshold and so on).

In an embodiment, the method comprises retrieving (by the client computing system) a digital certificate of a signing computing system providing the digital signature. However, the signing computing system may be of any type (see above) and its digital certificate may be retrieved in any way (for example, associated with the response, downloaded from the signing computing system and so on).

In an embodiment, the method comprises verifying (by the client computing system) the digital signature according to the digital certificate. However, the digital signature may be verified in any way (for example, by verifying that the digital certificate is valid, such as not expired, revoked and the like, only using it to retrieve the corresponding public key and so on).

In an embodiment, the method comprises retrieving (by the client computing system) the reference digests of the common libraries from corresponding publishing computing systems publishing the common libraries. However, the reference digests may be retrieved from any number and type of the publishing computing systems (for example, physical machines, virtual machines, cloud services and so on) in any way (for example, downloaded from public sites, received in response to corresponding requests and so on).

In an embodiment, the method is performed under the control of a browser running on the client computing system. However, the browser may be of any type and performing the method in any way (for example, directly, via a dedicated plug-in and so on).

In an embodiment, the common libraries are open-source. However, the common libraries may be released with any open-source license (for example, posing no usage/modification/distribution restriction, requiring one or more limitations and so on).

Generally, similar considerations apply if the same solution is implemented with equivalent methods (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a server computing system to perform the method of above when the computer program is executed on the server computing system. An embodiment provides a computer program product that comprises one or more computer readable storage media having program instructions collectively stored in said one or more computer readable storage media, the program instructions readable by a server computing system to cause the server computing system to perform the same method. An embodiment provides a computer program that is configured for causing a client computing system to perform the method of above when the computer program is executed on the client computing system. An embodiment provides a computer program product that comprises one or more computer readable storage media having program instructions collectively stored in said one or more computer readable storage media, the program instructions readable by a client computing system to cause the client computing system to perform the same method. However, the programs may be implemented as stand-alone modules, as plug-in for pre-existing programs (for example, a runtime environment for the server computing system and a browser for the client computing system) or even directly in the latter ones; moreover, the programs may take any form suitable to be used by any server computing system and client computing system (see below).

An embodiment provides a server computing system comprising means that are configured for performing the steps of the corresponding method. An embodiment provides a server computing system comprising a circuitry (that is, any hardware suitably configured, for example, by software) for performing each step of the same method. An embodiment provides a client computing system comprising means that are configured for performing the steps of the corresponding method. An embodiment provides a client computing system comprising a circuitry (that is, any hardware suitably configured, for example, by software) for performing each step of the same method. An embodiment provides a computing infrastructure comprising a server computing system and one or more client computing systems as above. However, the server computing system may be of any type (for example, a physical machine, a virtual machine, a cloud service and so on), the client computing system may be of any type (for example, a personal computer, a laptop, a smartphone a tablet and so on) and the computing infrastructure may have any architecture (for example, based on a global, local, wide area network, exploiting any type of wired and/or wireless connections, such as of metal wire, optical fiber, Wi-fi, mobile telephone or satellite type, and so on).

Generally, similar considerations apply if the server computing system, the client computing system and the computing infrastructure each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method (CIM) for use with a server computing system for tracking software usage that includes a plurality of common libraries, with each common library including a plurality of software components, and a plurality of running software programs that use the plurality of common libraries, CIM comprising:
   for each given common library of the plurality of common libraries, determining a plurality of identifiers identifying the plurality of software components included in the given common library,
   for each given common library of the plurality of common libraries, calculating a current digest value for the given common library by concatenating the identifiers of the software components of the common library and determining a hash value corresponding to the concatenated identifiers,
   for each given software program of the plurality of software programs, generating a digital signature of tracking information of the given software program, with the digital signature of tracking information including identifiers of a plurality of common libraries used by the given software programs and the current digests respectively associated with the plurality of common libraries used by the given software program,
   receiving a first call for a first program of the plurality of software programs, and
   returning a first response to the first call in association with the digital signature of tracking information for the first software program;
   wherein the concatenation of the identifiers is performed in alphabetical order of the identifiers of the respectively corresponding software components of each common library.

2. A computer program product (CPP) comprising:
   a set of storage device(s); and
   computer code stored collectively in the set of storage device(s), with the computer code including data and instructions to cause a processor(s) set to perform at least the following operations:
     for each given common library of the plurality of common libraries, determining a plurality of identifiers identifying the plurality of software components included in the given common library,
     for each given common library of the plurality of common libraries, calculating a current digest value for the given common library by concatenating the identifiers of the software components of the common library and determining a hash value corresponding to the concatenated identifiers,
     for each given software program of the plurality of software programs, generating a digital signature of tracking information of the given software program, with the digital signature of tracking information including identifiers of a plurality of common libraries used by the given software programs and the current digests respectively associated with the plurality of common libraries used by the given software program,
     receiving a first call for a first program of the plurality of software programs, and
     returning a first response to the first call in association with the digital signature of tracking information for the first software program.

3. The CPP according to claim 2, wherein the concatenation of the identifiers is performed in alphabetical order of the identifiers of the respectively corresponding software components of each common library.

4. A computer system (CS) comprising:
   a processor(s) set;
   a set of storage device(s); and
   computer code stored collectively in the set of storage device(s), with the computer code including data and instructions to cause the processor(s) set to perform at least the following operations:
     for each given common library of the plurality of common libraries, determining a plurality of identifiers identifying the plurality of software components included in the given common library,
     for each given common library of the plurality of common libraries, calculating a current digest value for the given common library by concatenating the identifiers of the software components of the common library and determining a hash value corresponding to the concatenated identifiers,
     for each given software program of the plurality of software programs, generating a digital signature of tracking information of the given software program, with the digital signature of tracking information including identifiers of a plurality of common libraries used by the given software programs and the current digests respectively associated with the plurality of common libraries used by the given software program,
receiving a first call for a first program of the plurality of software programs, and
returning a first response to the first call in association with the digital signature of tracking information for the first software program;
wherein the concatenation of the identifiers is performed in alphabetical order of the identifiers of the respectively corresponding software components of each common library.

* * * * *